US007177830B2

(12) United States Patent
Shields et al.

(10) Patent No.: US 7,177,830 B2
(45) Date of Patent: Feb. 13, 2007

(54) ON-LINE PAYMENT SYSTEM

(75) Inventors: Lisa A. Shields, Vancouver (CA); Jennifer E. Cameron, Vancouver (CA)

(73) Assignee: hyperWallet Systems, Inc., Vancouver, CA (US)

( * ) Notice: Subject to any disclaimer, the term of this patent is extended or adjusted under 35 U.S.C. 154(b) by 0 days.

(21) Appl. No.: 10/424,812

(22) Filed: Apr. 29, 2003

(65) Prior Publication Data
US 2004/0039692 A1    Feb. 26, 2004

Related U.S. Application Data

(63) Continuation of application No. 09/685,303, filed on Oct. 10, 2000, now abandoned.

(30) Foreign Application Priority Data
Sep. 15, 2000   (CA)   ................................ 2319919

(51) Int. Cl.
*G06Q 40/00* (2006.01)
(52) U.S. Cl. .............................. 705/35; 705/40; 705/44
(58) Field of Classification Search ................ 705/35, 705/40, 44
See application file for complete search history.

(56) References Cited
U.S. PATENT DOCUMENTS 5,465,206 A * 11/1995 Hilt et al. ..................... 705/40
6,006,204 A * 12/1999 Malcolm ...................... 705/30
6,023,684 A *  2/2000 Pearson ....................... 705/35
6,292,789 B1 *  9/2001 Schutzer ...................... 705/40
6,327,577 B1 * 12/2001 Garrison et al. .............. 705/40
6,390,362 B1 *  5/2002 Martin ....................... 235/379

* cited by examiner

*Primary Examiner*—Alain L. Bashore
(74) *Attorney, Agent, or Firm*—Kleinberg & Lerner, LLP; Marvin H. Kleinberg; Marshall A. Lerner

(57) ABSTRACT

An on-line payment system comprises a computer system which can maintain accounts in a database for a plurality of users. The system is enrolled as a payee in a bill payment system so that users can transfer funds from their bank accounts to electronic cash accounts in the system by making a bill payment to the system. The bill payment is deposited in a bank account maintained by the operator of the system. The system includes a double-entry, net zero accounting system which ensures that electronic cash in the accounts on the system is supported by actual cash on deposit in the bank account of the system. Users can spend electronic cash before the system actually receives funds via the bill payment system. Electronic cash spent during this period is marked uncleared by the system. The system includes reconciliation software which matches payments received to uncleared electronic cash and marks the electronic cash as being cleared. After the electronic cash has been cleared it can be converted into regular cash. The electronic cash of the system is recyclable, anonymous, and secure.

21 Claims, 5 Drawing Sheets

ON-LINE PAYMENT SYSTEM

TECHNICAL FIELD

This invention relates to payment systems. The invention relates in particular to Internet-based payment systems which permit users to make payments for on-line purchases of goods or services and which permits merchants to accept payments for such goods or services.

BACKGROUND

Electronic commerce is becoming increasingly important in the world economy. The number of financial transactions that take place on the Internet is soaring. One impediment to the continued growth of electronic commerce is the lack of suitable systems which permit on-line purchasers to make purchases and which permit on-line merchants to confidently accept payment for purchases. Traditional payment systems which include exchanging paper money, cheques or coins are not practical in the on-line environment.

Credit cards may be used to make on-line payments. However, credit cards have a number of disadvantages for both consumers and merchants. These include:

- not all prospective on-line purchasers have credit cards;
- merchants must pay significant premiums to accept credit card payments;
- in some cases credit card fees must be paid for attempted transactions, even if those transactions are not completed;
- credit cards cannot be used anonymously; and,
- credit card companies occasionally refuse payment to merchants after goods have been shipped or services provided;
- for their own protection, merchants typically require persons who wish to pay by credit card to provide a large amount of personal information. This is invasive and can discourage some users from proceeding with transactions.

There have been numerous attempts to create electronic payment systems which approach the liquidity, anonymity, security and ease of use that cash enjoys in the real economy. Many of these attempts have failed to gain acceptance. Each of the previous so called "electronic cash" systems has had one or more deficiencies. Some systems provide electronic cash which can be spent only for specific goods or services. Other electronic cash systems require all users to supply personal details, such as the user's name, social insurance number, bank account numbers, or the like and are not anonymous. Other systems are adapted to be useful primarily for making very small payments or very large payments. Other systems require that a merchant's computer system be integrated extensively with that of the operator of the payment system before the merchant can accept electronic payments. Other systems exist only in the on-line world. There is no way to convert electronic cash in these systems into currency that can be spent outside of the on-line environment.

A major difficulty with many prior electronic cash systems is that it is not easy to transfer funds into or out of the electronic cash system. Previous stored value electronic payment systems have used methods for adding funds to a stored value account which have significant limitations. Various schemes for adding funds have been proposed including using credit cards to transfer funds to an account or using automated clearing house (ACH) transactions. These prior systems all have disadvantages. They typically require the user to provide private information, such as bank account details to the operator of the electronic cash system.

Another major difficulty with some prior electronic cash systems is that they are susceptible to fraud. Criminals can generally find ways to use systems which permit the direct conversion of credit into spendable currency for making criminal gains.

Despite the numerous attempts to provide satisfactory systems for making payments in on-line transactions there remains a need for an easy-to-use, liquid, anonymous, recyclable, secure payment system which can be used in on-line purchases.

SUMMARY OF THE INVENTION

This invention provides methods and apparatus for facilitating on-line payments. A first aspect of the invention provides a method performed in a programmed computer system for administering an on-line payment system. The computer system maintains a database containing account information for a plurality of user accounts. The method comprises receiving deferred remittance information indicating an amount to be deposited by deferred remittance to a bank account associated with the computer system, for application to a first one of the user accounts and adding the amount to be deposited to a balance in the first one of the user accounts. The method includes marking the added amount as being uncleared in the database. The method continues by receiving a deposit notification indicating an amount of a remittance which has been deposited in the bank account for application to the first one of the user accounts. The method then reconciles the deposit notification with the deferred remittance information by: if the amount of the remittance is equal to the amount to be deposited, marking the added uncleared amount as being cleared in the database; if the amount of the remittance is less than the amount to be deposited, marking funds in the added uncleared amount totalling the amount of the remittance as being cleared in the database; and, if the amount of the remittance is greater than the amount to be deposited, marking the added uncleared amount as being cleared in the database and adding to the balance in the one user account an amount equal to the excess of the amount of the remittance over the added uncleared amount.

In preferred embodiments the deposit notification comprises an EDI notification from a bill payment system. The EDI notification may contain notifications of remittances for application to a plurality of the user accounts in which case the method comprises parsing the EDI notification to associate each of the remittances with one of the user accounts.

A preferred embodiment of the invention permits recording in the database a transaction involving a transfer of at least a portion of the added uncleared amount from the first one of the user accounts to a second one of the user accounts before receiving the deposit notification. This permits users to spend electronic cash immediately without waiting for a banking institution to transfer funds to an operator of the computer system.

Another aspect of the invention comprises a method for adding value to an account in a stored value on-line payment system. The method of this aspect of the invention comprises in a banking computer system, identifying an operator of a stored value on-line payment system as a bill payee associated with a bank account; supplying an ID of a user account on the stored value on-line payment system as an account number; and, instructing the banking computer system to make a bill payment to the operator of the stored value on-line payment system in a selected amount, from funds in the bank account.

In preferred embodiments, identifying an operator of a stored value on-line payment system as a bill payee associated with a bank account comprises selecting the operator from a list of authorized bill payees maintained by the banking system. This makes it very easy for users who have access to online banking to transfer funds to stored-value accounts on the computer system.

A further aspect of the invention provides a computer system for facilitating on-line payments. The computer system comprises a database containing account information for a plurality of user accounts; an interface for receiving deposit information regarding amounts of deferred remittances to be made to a bank account associated with the computer system for application to the user accounts; and, a banking interface for receiving notifications of remittances deposited in the bank account. The computer system is configured to: add the amount of a deferred remittance to a balance in a corresponding one of the user accounts upon receiving the deposit information and mark the added amount in the database as being uncleared; and, upon receiving a notification of one or more remittances deposited in the bank account, reconciling the remittances with uncleared amounts in the database and marking reconciled uncleared amounts as being cleared.

Preferably the computer system comprises a database management system, an accounting system and a reconciliation system wherein the accounting system maintains account balances of the user accounts in the database and generates records of transactions involving transfers of funds into or out of the user accounts and the reconciliation system tracks whether or not funds in the user accounts correspond to funds actually received in a bank account associated with the computer system.

Further features and advantages of the invention are described below.

BRIEF DESCRIPTION OF DRAWINGS

In figures which illustrate non-limiting embodiments of the invention.

DESCRIPTION

System Overview

Figure 1:
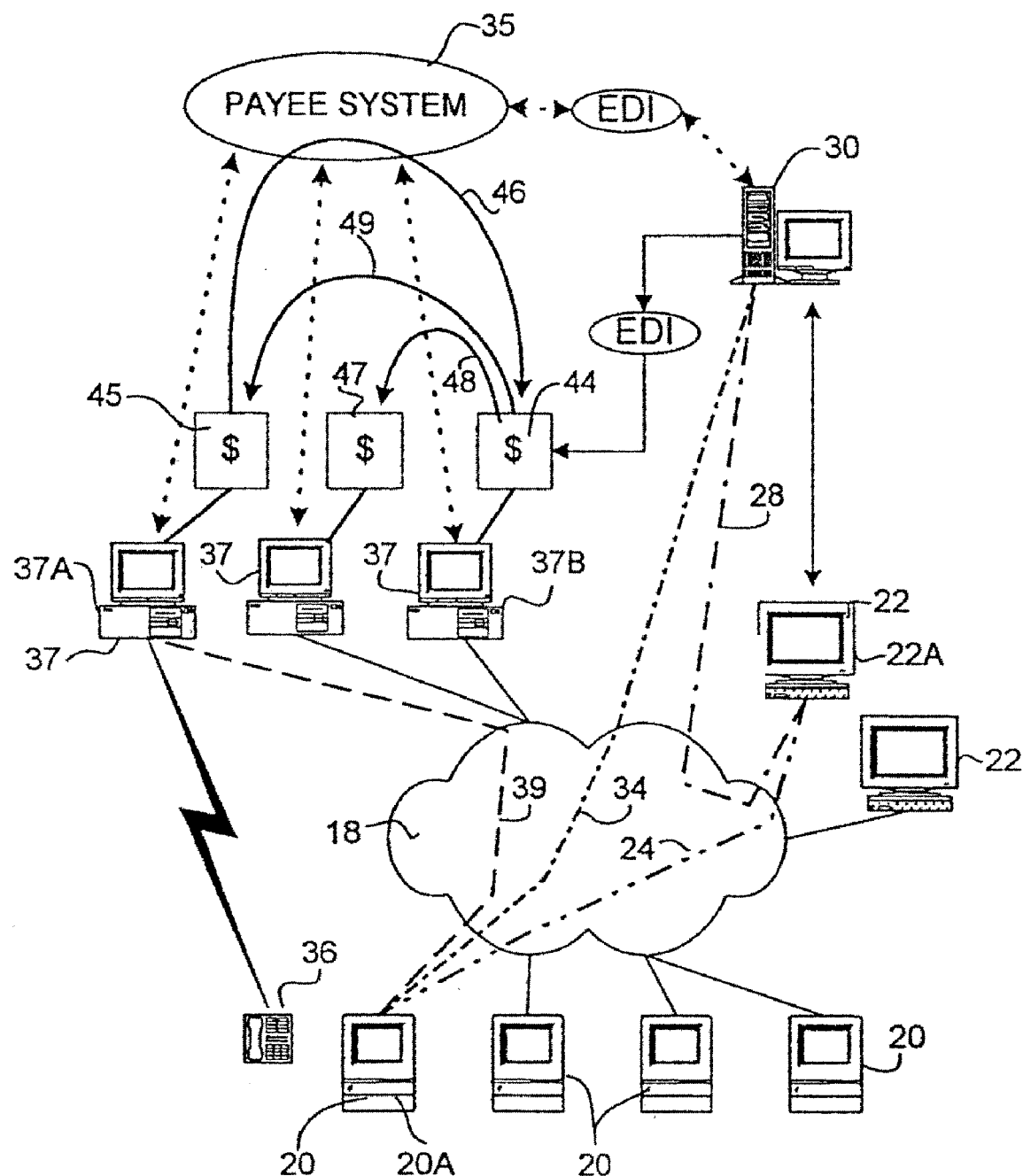
FIG. 1 is a schematic view of an overall on-line payment system according to the invention.

This invention provides an electronic payment system in which users can maintain accounts containing electronic currency. FIG. 1 illustrates a network 18 to which a number of user computers 20 are connected. Network 18 may be, for example, the Internet. One or more merchants have merchant computers 22 connected to network 18. Merchant computers 22 typically comprise web servers hosting web sites which contain offers of goods or services for sale. The technology for creating and operating web sites is well understood to those skilled in the art of designing electronic commerce applications and is therefore not be described here. User computers 20 can establish data communication with merchant computers 22 by way of network 18.

Suppose a user at a user computer 20A wishes to purchase a product offered by a merchant on a web site hosted on a merchant computer 22A operating as a web server. The user causes computer 20A to establish a data connection 24 with merchant computer 22A, for example, by using web browser software running on computer 20A to navigate to a page of the merchant's web site. Some examples of currently available web browsers which may be used on user computers 20 are EXPLORER™ from Microsoft Corporation and NAVIGATOR™ from Netscape Communications Corporation. Data connection 24 will typically be a secure connection. For example, data connection 24 may comprise an encrypted SSL session.

The user can place an order for goods or services via data connection 24. This invention provides a computer system 30 connected to network 18. Computer system 30 maintains accounts 42 (which have been previously set up) for both the user of computer 20A and the merchant who will be supplying the products or services requested by the user from computer 22A.

Figure 2:
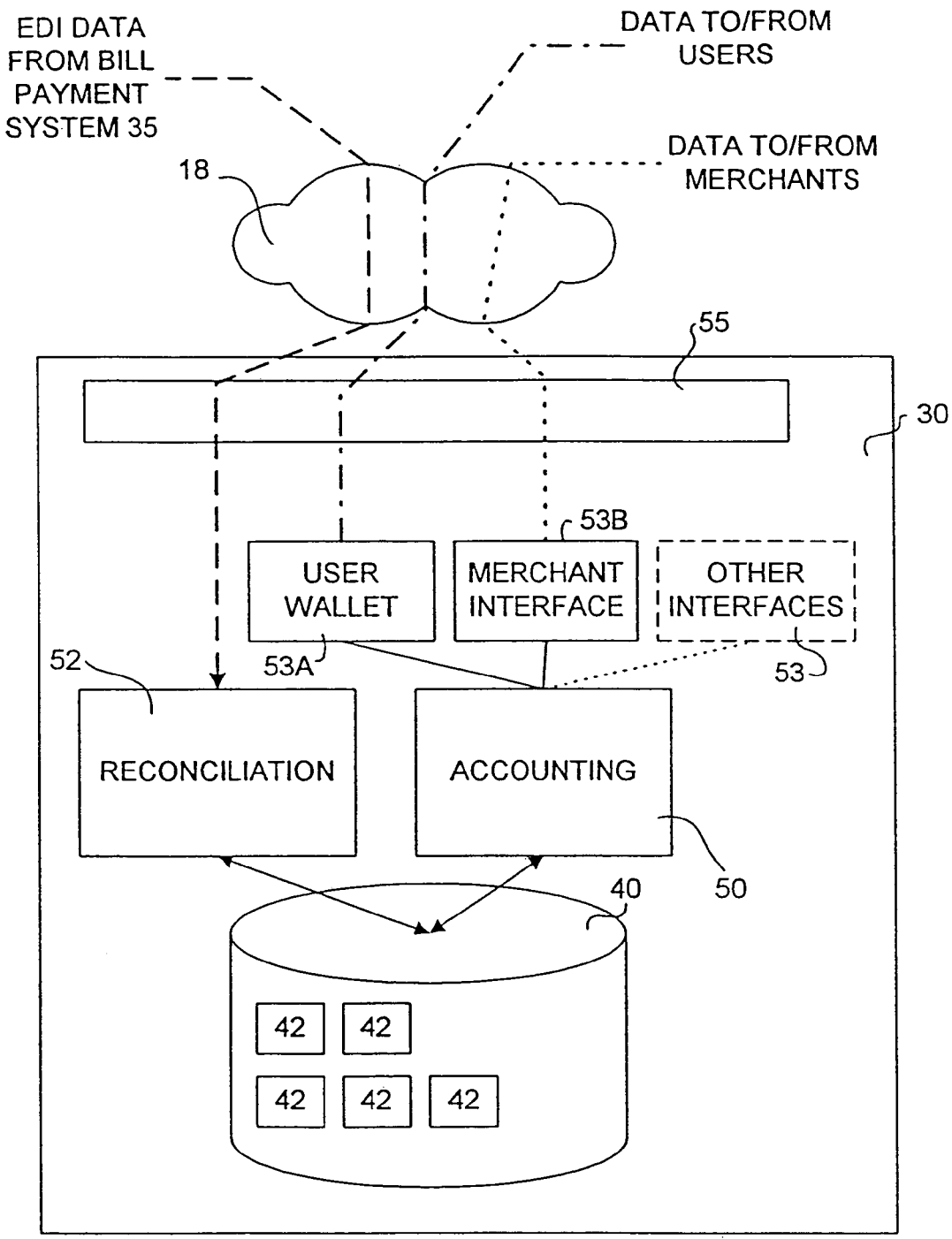
FIG. 2 is a block diagram showing major functional components of a computer system for use in practising the invention.

As shown in FIG. 2, computer system 30 comprises a database 40. Database 40 contains details about each user account. The user accounts are indicated symbolically by the reference numeral 42. The database contains account balances, account names ("IDs"), passwords and the like for each account 42. Database 40 also contains details of each transaction involving any of accounts 42.

Preferably database 40 comprises a relational database. For example, the currently preferred embodiment of the invention comprises an ORACLE™ model 8i relational database available form Oracle Corporation of Redwood Shores Calif. U.S.A. operated in an archivelog mode. When the database is operated in this mode all transactions are preserved and can be recreated in the event of a computer crash or other system failure affecting computer system 30.

An accounting system 50 monitors and updates the status of accounts 42 in database 40. One or more interfaces 53 connect to accounting system 50. Interfaces 53 can provide users with access to information from accounting system 50 and the ability to supply new information to accounting system 50 in a way which is convenient for the particular user. For example, users might access information about their accounts 42 and provide instructions for various transactions involving their accounts 42 via a simple interface 53A to accounting system 50. User interface 53A could provides functions according to a wallet metaphor, as described below. Suitable firewall systems 55 block unauthorized access to computer system 30 and provide encryption and decryption of outgoing and incoming communications as is known to those skilled in the art.

Merchants will likely desire an interface to accounting system 50 which allows the merchant's computer system to make automated queries of accounting system 50 regarding the status of the merchant's account, the status of past transactions or the like. A merchant interface 53B provides merchants access to accounting system 50. Other interfaces 53 could be provided. Each interface can be refined for use in a particular business environment. For example an interface 53 could be provided with features specifically designed to facilitate business-to-business transactions.

Merchant computer 22A may present the user with several payment options. The user can indicate to merchant computer 22A that the user wishes to make payment for the goods or services being ordered by way of the user's account 42 on computer system 30.

When a user indicates that he or she wishes to pay using funds from an account 42 on computer system 30, merchant computer 22A generates purchase information, including at least information identifying the merchant and the amount of the transaction and sends the purchase information to computer system 30 by way of network 18 as indicated by line 28. The purchase information is encrypted and authenticated in a manner such that its source (the merchant) can be verified. For example, the purchase information may be provided in the form of a string which has been encrypted using a public key of computer system 30 (for which computer system 30 has a corresponding private key) and digitally signed by merchant computer 22A. The encrypted and signed purchase string is then transmitted to computer system 30 over link 28. This may be done, for example, by embedding the purchase string in a hyper text markup language ("HTML") form which posts to a location on computer system 30. The purchase string may conveniently be contained in a hidden field in an HTML form.

Computer system 30 then communicates with the user of computer 20A on a connection 34 between computer system 30 and user computer 20A by way of network 18. Connection 34 is preferably established by merchant computer 22A redirecting computer 20A to computer system 30. Computer system 30 authenticates the identification of the user and invites the user to confirm the transaction. Preferably computer system 30 displays information about the proposed transaction to the user and invites the user to confirm that the user wishes to proceed. The information may, for example, include the name of the merchant, the total amount of the transaction, and a short description of the goods or services being purchased if such a description is included in the purchase string.

Authentication may be performed in any of various ways. A simple form of authentication involves requiring the user to supply a user name and a password. After the user confirms the transaction, computer system 30 transfers funds from the account 42 of the user to the account of the merchant. Preferably, computer system 30 also creates a "receipt" record which the user can view by logging on to computer system 30 with the ID of account 42 and the user's password. In this way the user can automatically maintain a record of how funds in the user's account 42 have been disbursed.

The operator of computer system 30 may charge the merchant a fee for this service. For example, computer system 30 may transfer to the merchant's account an amount equal to 99% of the value of the transaction and may transfer the remaining 1% of the value of the transaction from the user's account to an account maintained by the operator of computer system 30 as a commission. After the transaction has been completed, computer system 30 notifies the merchant that the funds have been transferred to the merchant's account 42 on computer system 30 so that the merchant knows that it can proceed to ship goods or provide services with the knowledge that payment has been secured. In essence, computer system 30 acts as a trusted intermediary between different users of system 30. Transactions may occur between individual users, between individual users and merchants, or between merchants.

It is noteworthy that merchant computer 22A does not need to retain any information about the identity of the user who purchases goods or services. This is unlike the case of credit card payments wherein a record of the user's name and credit card number is typically left on merchant computer 22A. Of course, where goods are being purchased, the merchant will need to know where the goods should be shipped. However, the consignee of the goods is not necessarily the same as the person paying for the goods.

Account Creation

To use the system of this invention to make payments a user first must set up an account 42. Computer system 30 preferably includes an account creation interface which permits a user to request that a new account be opened on computer system 30. In currently preferred embodiments of the invention the account creation interface comprises a web page containing a form which requests information from the user. The web page is preferably hosted on a secure server so that information exchanged between the user and computer system 30 cannot be readily intercepted by others. Preferably the interface requests no more information than is both necessary for the operation of computer system 30 and required by any applicable laws. Computer system 30 does not require the name, address, social security number or other personal information about someone who wishes to set up a new account on computer system 30. The account creation interface may, for example, simply request the user's e-mail address and some kind of authentication, such as a password.

In response to a request by a user for a new account, computer system 30 creates a new account 42 for the user (typically by creating a new record in database 40, as described below) and informs the user of a number or name which identifies the account. Computer system 30 also permits the user to select a password for use in authenticating the identification of the user. Computer system 30 may accept a number of "challenge questions" and answers for use in case the user forgets his or her password.

Computer system 30 preferably requests and stores an e-mail address of the user at the time a new account is being open so that computer system 30 can send e-mail to the user to confirm that the new account has been set up. The e-mail address may also be used to send notifications of transactions to the user. For example, computer system 30 may automatically send an e-mail to the user's e-mail address whenever funds have been deposited in the user's account 42. Further, as described below, if computer system 30 is configured so that each account 42 corresponds to a unique e-mail address then computer system 30 can allow a user can direct funds from his or her account 42 to another user's account 42 by simply supplying the other user's e-mail address and the amount to be transferred.

If the user is a merchant who wishes to set up a merchant account then computer system 30 will typically request additional information about the user such as the user's legal name, address, bank account number, and the like. This information is required to screen the user for suitability and to set up transfers of funds from the merchant's account on computer system 30 to the merchant's bank account. The operator of computer system 30 may require that all merchants enter formal legal agreements with the operator before an account for the merchant is activated on computer system 30. The legal agreements could govern matters such as any commissions to be deducted by the operators of computer system 30, procedures for handling disputes, procedures for transferring funds to the merchant and the like.

The operator of computer system 30 may periodically transfer from its account 44 funds in the amount of the balance in a merchant's account 42 to a bank account 47 of the merchant. This may be done, for example, by way of an electronic data interchange (EDI) transaction wherein computer system 30 generates an EDI message instructing bank 37B to transfer funds from its account 44 to the merchant's bank account 47 as indicated by line 48. Preferably computer system 30 requests that the funds transfer be authorized by a supervisor logged onto computer system 30 before the EDI message is sent to bank 37B. For reasons of security, EDI transactions are currently typically handled over dedicated connections.

Adding Funds to an Account

After an account has been set up the user must transfer some funds into the account in order to be able to purchase goods and services on-line. A feature of the system which is considered to be inventive is that the system uses the "payee" or "bill payment" system 35 maintained by banks and other financial institutions as a vehicle for transferring funds into accounts on computer system 30. In Canada, a successful bill payment system is run by the Canadian Payments Association. Bill payment system 35 is typically used for paying recurring bills such as utility bills, credit card bills and the like. The bill payment system permits customers of a bank to pay their bills by transferring funds from an account held at the bank to the payee. Most banks now permit their customers to access bill payment system 35 by way of Internet web servers 37, telephone interfaces 38 and automated teller machines ("ATMs").

In the example shown in FIG. 1, a user of computer 20A is connecting to a web site maintained by her bank on a computer 37A on a data connection 39. The user could also use a telephone 36 to access her bank's computer system which will allow her to pay bills using bill payment system 35.

The operator of computer system 30 arranges to be listed as a payee by major banks. Users who wish to deposit funds into their accounts 42 on computer system 30 have their bank accounts configured to include the operator of computer system 30 as a payee (using the name of the user's account 42 on computer system 30 as the "account number"). In general this information needs only be entered once into the bank's computer system. After the user has had the bank set up their account to permit making payments to the operator of computer system 30 then the user can add funds to their electronic cash account by simply making a payment in the same manner that they would pay a bill to the telephone company.

The operator of computer system 30 maintains a bank account 44 at a bank or other financial institution 37B. When a bank 37A receives instructions to make a bill payment to the operators of computer system 30 from a user's account 45 then, as indicated by arrow 46, bank 37A transfers funds from the user's account 45 to the bank account 44 maintained by the operator of computer system 30 by way of payee system 35. Bank 37A also sends to the operator of computer system 30 a notice indicating that the funds have been transferred. The notice includes the amount of the transfer and the account on computer system 30 for which the funds are intended. The operator of computer system 30 can then increment the amount of electronic cash in the user's account 42.

It can be appreciated that since the existing bill payment system is used to transfer funds from the bank accounts of users to the bank account of the operator of computer system 30, no systems-level integration with the bank is required. Furthermore, all transfers of funds to computer system 30 remain under the control of the user. The operator of computer system 30 has no way to obtain any funds from a user's bank account.

Another feature of computer system 30 is that it is simple for anyone to deposit funds into an account 42 from their bank account. Thus, a parent could transfer funds from a bank account to a child's account 42 in the same manner described above. All that is necessary is for the person who wishes to transfer the funds to know the ID of the account 42 to which the funds are to be transferred or the e-mail address corresponding to that account.

Quick Access to Funds

Delayed access to funds upon opening an account can frustrate on-line transactions. When funds are transferred from a user's bank account 45 to a bank account 44 of the operator of system 30 the fund transfer does not occur instantaneously. For example, bill payments made on one business day are typically processed overnight by payee system 35 and deposited to the account of the payee on the next business day. Forcing users to wait for 24 hours before funds which the user has transferred to an account 42 are available to be spent could result in the user becoming frustrated and either reconsidering a transaction with a merchant or using an alternative means of payment.

Preferred aspects of this invention therefore permit users to enter transactions with merchants immediately after depositing funds into an account 42 by way of payee system 35. To do so, the user first initiates a deferred remittance to the user's account 42, as described above. The user then communicates to computer system 30 that the payment has been made. Computer system 30 preferably includes a web-based interface which permits a user to provide deferred remittance information which indicates that the user has initiated a transfer of funds and indicating the amount of funds which will be transferred to the user's account 42.

The interface preferably records in database 40 information such as the ID of the user's account 42, the date/time of the notification, the payment amount, the payment currency, the banking institution's reference number. This information can be matched against payments received from banking institutions for assistance in reconciling deferred remittance information supplied by users with remittances received by way of payee system 35.

When a user indicates that funds have been transferred to an account 42 but the funds have not yet been received in bank account 44 by computer system 30 then computer system 30 immediately increments the amount in the user's account 42 but marks the newly deposited funds as being "uncleared". Database 40 contains for each account 42 the balance of "cleared" funds in the account 42 and the balance of "uncleared" funds in the account. The cleared balance in an account 42 is an amount in relation to which the operator of computer system 30 has actually received a transfer of funds which are being held in bank account 44.

An uncleared balance in an account 42 can still be spent by a user as described above. However, the confirmation of the transaction sent by computer system 30 to the merchant's computer 22A indicates that the funds are uncleared. Computer system 30 either advises the merchant when previously uncleared funds involved in a transaction become cleared or provides a way for the merchant to check the status of the merchant's pending transactions. Uncleared funds may be transferred between various accounts 42 in computer system 30. The uncleared status of the funds stays with the funds until computer system 30 received confirmation from bill payment system 35 that the funds have been deposited into bank account 44. Computer system 30 then clears the funds as described below.

Any transactions that cannot be cleared within a desired time frame (for example, within 30 hours) are automatically recalled by computer system 30. Computer system 30 reverses recalled transactions from the accounts 42 of both the user and the merchant. Preferably, when a transaction has been recalled, computer system 30 automatically creates a message to the holder of each affected account 42 which explains that the recall has taken place. The message may be made available when the user logs onto computer system 30 or may be e-mailed to the user, for example.

Converting Electronic Cash into Cash

In some cases a user will wish to convert funds from their account 42 back into regular cash. This can be achieved in essentially the same manner that computer system 30 channels funds to merchants. Preferably computer system 30 comprises a user interface which permits a user to request that any cleared funds in an account 42 be transferred to a bank account specified by the user. The interface requests from the user information required to make a fund transfer from account 44 to the user's bank account. For example, the interface may request that the user supply the number of the account 42 from which the user wishes to transfer funds, the amount of funds to transfer, and the bank, bank branch, bank account number, and name of the holder of the bank account to which the user wishes to transfer funds. The interface may comprise, for example, a form on a web page maintained on computer system 30 that the user can fill out.

Computer system 30 authenticates the identity of the user, for example, by requesting that the user specify a password for account 42, and checks to ensure that there are sufficient cleared funds in the account 42 to satisfy the transfer request. If so then computer system 30 decrements the amount in account 42 and prepares an EDI request that funds be transferred from bank account 44 to the user's bank account. Computer system 30 then seeks authorization from a supervisor logged into computer system 30 that the funds transfer is acceptable. Computer system 30 then sends the EDI document requesting the transfer to bank 37B. Computer system 30 will not permit uncleared funds to be transferred to an account outside of computer system 30.

Wallet Metaphor

In preferred embodiments of the invention accounts 42 on computer system 30 are like "wallets" in the sense that they can contain cash as well as other related information that the user wishes to keep together. A user can access the user's "wallet" by logging into computer system 30 with the ID of the user's account 42 and the user's password. In addition to being able to view the current balance of account 42, receipts describing past transactions, messages from computer system 30 and the like, computer system 30 may reinforce the wallet metaphor by providing a logged-in user with an area to keep shopping lists, electronic business cards, scanned photographs, coupons for on-line purchases, counters which record the number of incentive points available to the user in various incentive programs, and the like.

Transferring Funds Between Accounts

Computer system 30 preferably permits the holder of one account 42 to transfer funds to another account 42. This may involve, for example, providing a web based interface which permits a user to identify a second account 42 to which a specified amount of funds should be transferred from a first account 42.

Multiple Currencies

There is nothing about the design of computer system 30 that restricts its use to a specific currency. The operator of computer system 30 may maintain bank accounts 44 in various currencies. Computer system 30 may contain accounts 42 in various currencies. When a user who has an account 42 containing funds in one currency wishes to pay for goods or services in a different currency then computer system 30 determines the appropriate exchange rate and calculates the amount of the transaction in the currency of the user's account 42. This may be done, for example, by obtaining an exchange rate quote from a third party by way of network 18. The user can decide whether or not to proceed with the transaction. If the user does decide to proceed with the transaction then the user's account 42 is debited by the calculated amount of the first currency and the merchant's account 42 is credited with the amount of the transaction in the second currency. Where computer system 30 handles accounts 42 in multiple currencies then computer system 30 preferably tracks the total value deposited in accounts 42 in each currency and, where necessary, initiates requests for foreign exchange transactions to be made between different bank accounts 44. Computer system 30 attempts to ensure that the full amount of funds in each account 42 is backed by funds in the same currency as that of the account 42 held in a bank account 44.

For example, suppose that the operator of computer system 30 maintains two bank accounts 44, one containing Canadian dollars and one containing United States dollars. Initially suppose the Canadian dollars bank account 44 contains CAD $10,000,000 and the United States dollar bank account 44 contains USD $10,000,000. Assume that in one day users who have accounts 42 containing Canadian dollars make purchases in U.S. dollars totalling US $1,000,000 and, for the sake of this simple example, that no users having accounts 42 containing U.S. dollars make any purchases in Canadian currency. If the exchange rate is CAD $1.500=USD $1.000 then, at the end of the day, the total value held in Canadian dollars accounts 42 would be only CAD $8,500,000 whereas the total value held in U.S. dollars accounts 42 would be U.S. $11,000,000. However, the Canadian and U.S. dollar bank accounts maintained by the operator of computer system 30 would still each contain $10,000,000 in their respective currencies. To ensure that the funds in accounts 42 are all backed by government-issued dollars, computer system 30 would generate a request that $1,500,000 from the Canadian dollar bank account 44 be used to purchase US $1,000,000 to be deposited into the U.S. dollar bank account 44. After completion of this transaction the Canadian dollar bank account 44 holds CAD $8,500,000 which balances with the CAD $8,500,000 remaining in Canadian dollar accounts 42 and the U.S. dollar bank account 44 holds USD $11,000,000 which balances with the total USD $11,000,000 being held at the end of the day in U.S. dollar accounts 42.

Special Purpose Wallets

Computer system 30 may provide specialized accounts 42 which include certain restrictions on their use. For example, a parent may set up an account 42 for a child which has been configured to permit funds to be spent only at certain merchants or which will permit only a certain amount to be spent in a specified period.

Reconciliation

Computer system 30 preferably implements a double-entry, "net zero" accounting system 50 and a reconciliation system 52. Reconciliation system 52 receives from payee system 35 a list of all transactions involving payments made by users to account 44. The list of transactions is preferably received electronically from bill payment system 35 in EDI format. A transaction list containing a list of remittances made to account 44 by way of bill payment system 35 during the previous business day is typically received every weeknight.

Reconciliation system 52 then parses the EDI files to identify the details of each transaction including the names of the account 42 involved in the transaction, the amount of the transaction and so on. This information is then reconciled with the information in database 40 as managed by accounting system 50. Remittance information is entered into accounting system 50. Funds which were flagged as being uncleared are matched up with remittances and marked cleared by reconciliation system 52. Reconciliation system 52 (or accounting system 50) confirms that the total amount of cleared funds in accounts 42 matches a balance maintained in bank account 44.

Reconciliation system 52 may operate by associating each remittance with an account 42. After this has been done then reconciliation system 52 can determine if database 40 contains a record of any uncleared funds which originated from that account 42 or are still in the account 42. If there are no such uncleared funds then the balance in account 42 is incremented by the amount of the remittance.

If reconciliation system 52 determines that there are uncleared funds which were used in transactions originating from the account 42 then reconciliation system 52 begins marking the uncleared funds as being cleared. This may be done, for example, by taking those transactions which originate from the account 42, and involve uncleared funds, in chronological order and marking the funds involved in those transactions in database 40 as being cleared. Reconciliation system 52 continues until the total amount of funds which it has cleared equals the amount of the remittance (or there are no more transactions involving uncleared funds which originated from that account 42).

If the entire remittance has not been applied by the point that reconciliation system 42 has cleared all uncleared funds in transactions which originated from that account 42, then reconciliation system applies the remainder of the remittance to the account 42, first by clearing funds in account 42 which were deposited into account 42 with a remittance to follow and, if the remittance is large enough adding uncleared funds to the balance in account 42.

Figure 3:
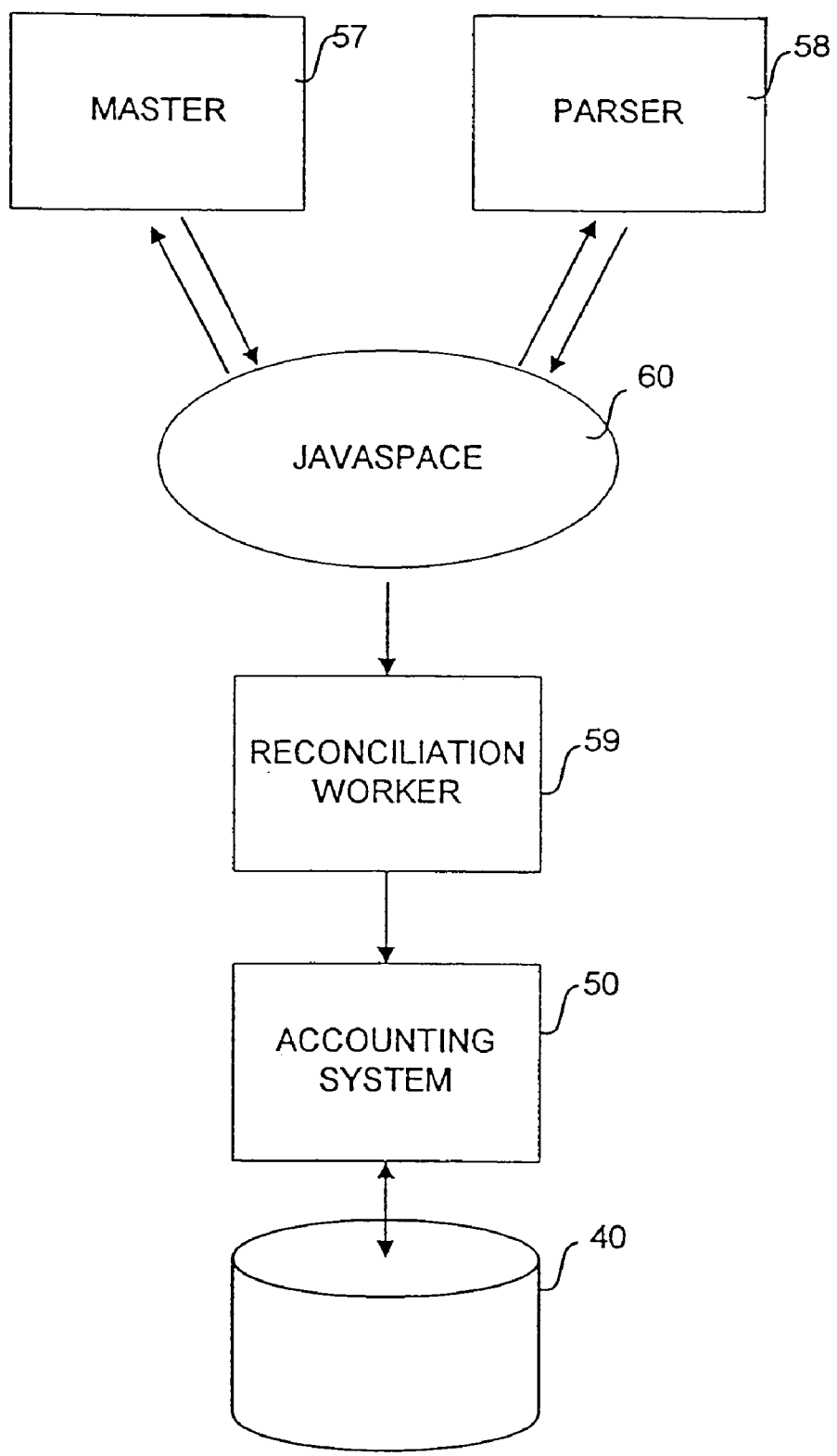
FIG. 3 is a schematic view of a reconciliation system according to a currently preferred embodiment of the invention.

FIG. 3 illustrates one embodiment of reconciliation system 52 which includes three software objects written to the JINI™ specification promulgated by Sun Microsystems. The objects run on one or more computers and interact using JAVASPACES™ technology. JAVASPACES is a software technology which provides a virtual space between providers and requesters of network resources or objects. Reconciliation system 52 includes a master process 57 which receives EDI documents from payee system 35, a parser 58 which parses EDI documents and a reconciliation worker process 59 which connects to accounting system 50 to reconcile data in the EDI report with the data of accounting system 50 in database 40. Objects 57, 58 and 59 interact by way of a JavaSpace 60.

In operation, master process 57 receives an EDI record of remittances from payee system 35. Master process writes a parsing order to JavaSpace 60. One or more instances of parser 58 receive the parsing order and parse the EDI document. The parsed records are written to JavaSpace 60. Master process 57 retrieves the parsed records and creates reports. Reconciliation worker 59 also retrieves the parsed records and connects to accounting system 50 to attempt to reconcile the parsed records with transactions recorded in database 40.

Merchant e-commerce Site

One advantage of this invention is that it permits merchants to configure their on-line presences to accept payment via computer system 30 very quickly and with very little effort. Substantially all processing of payment requests can occur at computer system 30. There is therefore no need to build into a merchant's web site sophisticated software for, for example, processing credit card transactions. As noted above, for a merchant to have payments directed to its account on computer system 30 the merchant's computer 22 only needs to include software which creates and sends to computer system 30 a purchase string and redirects the user to computer system 30.

Such software can be provided in the form of a module which can be easily inserted into the web site of the merchant. No large scale modifications of the merchant's web site are required. Assuming that the software is initially set up to identify the merchant, the only variable information that it is necessary for the merchant's computer 22 to provide in the purchase string is the total amount of the transaction. Thus, if the merchant has an existing e-commerce web site, the software can be very quick and easy for a merchant to integrate into the web site.

Preferred embodiments of the invention provide a downloadable merchant integration kit ("MIK") which contains the software necessary for modifying an existing e-commerce web site to accept payment according to this invention. A currently preferred embodiment of the MIK includes four main components as follows:

a PurchaseEncryptor component, which is used to securely send customer purchases to computer system 30;

a NotificationDecryptor component, which receives notifications from computer system 30 of completed purchases and key changes;

a FundsStatusReportGenerator which the merchant can use to query computer system 30 via merchant interface 53B to determine the status of funds used in a purchase (the FundsStatusReportGenerator may be used, for example, to determine whether funds paid by a user have been cleared or remain uncleared); and, a KeyPairFileGenerator tool, which generates public and private key files and digital signatures that are used by the other components for encrypting communications to computer system 30, decrypting communications from computer system 30 and authenticating messages to computer system 30 as originating with the merchant.

The merchant can install the software in the MIK and then generate a key pair using the KeyPairFileGenerator tool. The private key of the key pair is saved in a file on the merchant's computer system 22. The public key of the key pair is delivered to computer system 30. Preferably computer system 30 provides a web-based interface to which the merchant can connect to upload the merchant's public key. After it has the merchant's public key, computer system 30 can encrypt communications to the merchant.

In preferred embodiments of the invention, the merchant computer 22 is configured to provide three different uniform resource locators ("URLs") for receiving notifications from computer system 30. In the currently preferred embodiment of the invention the merchant computer 22 comprises:

- a SuccessURL—the URL posted to after a successful purchase;
- a FailureURL—the URL posted to after an unsuccessful purchase; and,
- a NotificationURL—the URL posted to asynchronously after a purchase.

The NotificationURL may be used to deliver other notifications to the merchant computer 22 such as key change notification (which indicate that communications to computer system 30 should be encrypted with a new public key). Preferably computer system 30 provides a web-based interface which permits a merchant to specify these URLs.

The PurchaseEncryptor is used to encrypt purchases before they are sent to computer system 30 to be processed. The encryption process has the three purposes of:

- Authentication: verifying that the purchase is coming from the merchant's site;
- Integrity: ensuring that the purchase information is not altered on route; and,
- Privacy: protecting the privacy of the transaction by ensuring the purchase information is only readable by computer system 30.

Authentication may be accomplished by digitally signing the purchase using a Signature key, which is typically the merchant's private key, generated by the KeyGenerator tool. When computer system 30 receives a signed communication from a merchant, the merchant's public key is used to verify the signature.

Integrity is maintained by using message digests. A message digest of the actual purchase information is generated using the merchant's private key and a one-way hash function. This prevents the purchase information from being modified, as only the exact same purchase information will generate the same message digest. Privacy is maintained by encrypting the signed purchase with the public key of computer system 30 (which may be contained in the MIK) so that only the computer system 30 can read purchase information sent by any merchant.

In a current embodiment pf the invention the Purchase Encryptor component of the MIK can be used on a merchant computer system 22 to encrypt purchases by calling an encryptPurchase method. This method takes 9 string parameters as follows:

- MerchantID—the ID of the merchant's account 42;
- PurchaseRefNum—the merchant generated reference number for the purchase e.g. the merchant's PO number for the order;
- Description—a description in plain text of the purchase;
- Long Description—a longer version of the purchase description in either plain text, html or xml;
- Long Description Format—Plain Text, HTML, or XML depending on the format chosen for the Long Description;
- MerchantParameters—merchant specific parameters that are not used by computer system 30 system other than being passed back to the merchant after the transaction has completed. This field is provided for the merchant's convenience;
- MerchantNotes—notes that the merchant wants to appear in their receipts on computer system 30;
- AcceptUnclearedFunds—(yes/no) a parameter indicating whether the merchant will allow the purchase may be made with uncleared funds;
- Total—the total amount of the purchase including tax, shipping and any other charges incurred; and,
- CurrencyCode—the type of currency being used.

The Purchase Encryptor component uses values of these parameters supplied by the merchant to create a signed encrypted purchase string for delivery to computer system 30.

After a user has attempted to pay for a purchase using an account on computer system 30, computer system 30 preferably offers to return the user to the web site of the merchant from whom the purchase was made. If the customer accepts this redirection then computer system 30 redirects the user to the web site on the merchant's computer system 22 and appends to the URL of the merchant's web site a post parameter field called Notification. The value of the Notification field is the encrypted and digitally signed results of the purchase which the merchant can decrypt using the NotificationDecryptor component of the MIK.

Computer system 30 also posts asynchronously to the merchant's NotificationURL with the outcome of the transaction (success or failure). This is to guarantee that the merchant is informed of the out come of the transaction even if the user elects not to return to the merchant's web site. In either case the NotificationDecryptor is used to decrypt the notification to obtain the results of the purchase.

The FundsStatusReportGenerator may be used in a merchant computer system 22 to programmatically query computer system 30 to determine if the funds for a given purchase have cleared yet. The query results may be returned in various ways, for example, as objects or as an xml documents.

EXAMPLE 1

Figure 4:
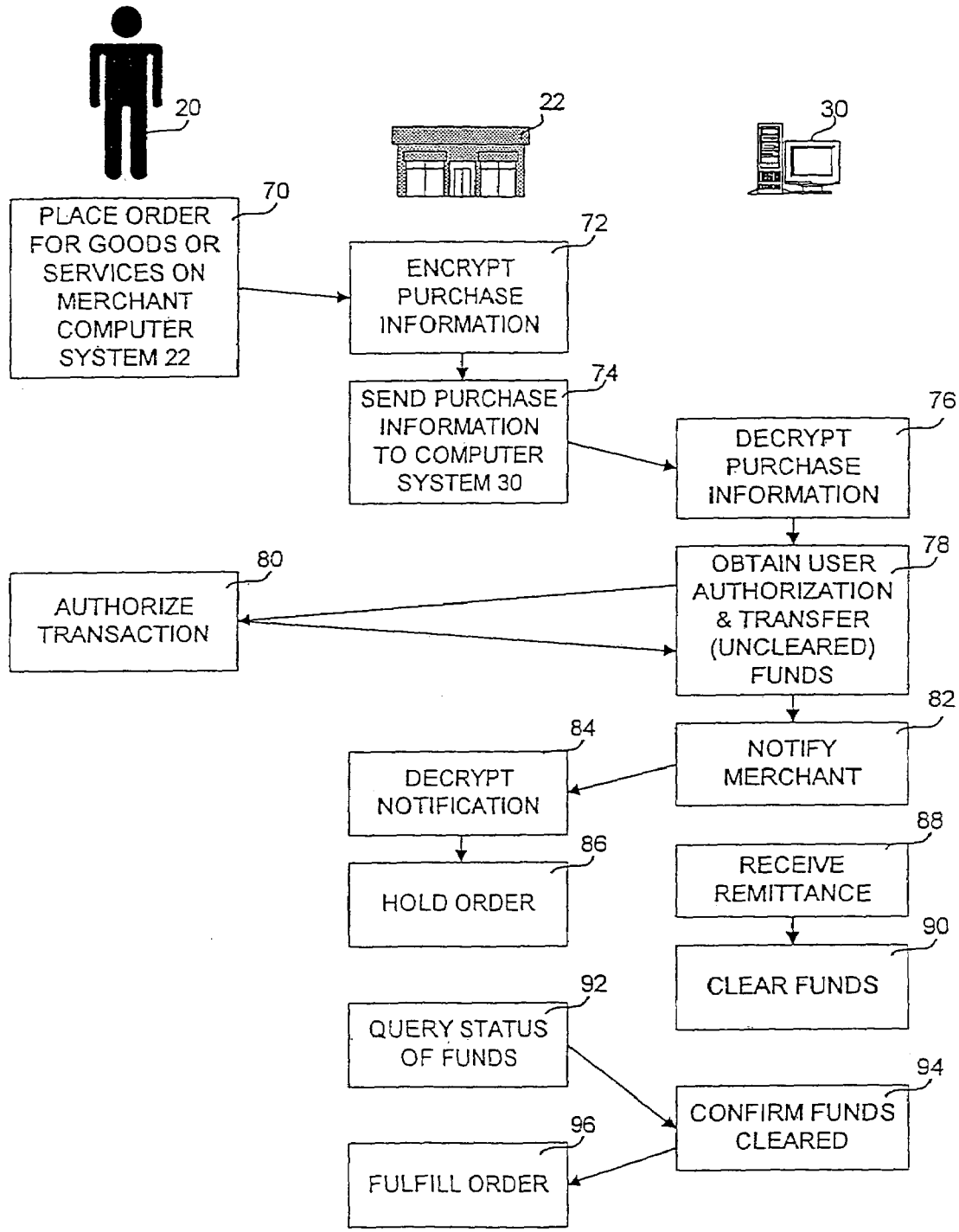
FIG. 4 is a flow chart illustrating a sequence of events which occurs when a consumer attempts to spend uncleared electronic cash in a system according to one embodiment of the invention; and, FIG. 5 is a diagram illustrating the manner in which electronic cash can be recycled in a system according to the invention.

FIG. 4 shows a time line which illustrates the sequence of major actions which occurs when computer system 30 is used. A user at a user computer 20 first places an order 70 for goods or services at a web site hosted on a merchant's computer 22. The merchant encrypts 72 purchase information and sends 74 the encrypted purchase information to computer system 30. Computer system 30 decrypts 76 the purchase information and obtains 78 authorization from the user to proceed with the transaction. In this example, the user has insufficient cleared funds in her account 42 to proceed with the transaction but the user does have uncleared funds in her account as a result of a payment made from the user's bank account earlier in the day. The user authorizes 80 the transaction.

If the merchant's account were configured to accept only cleared funds then the transaction would fail. However, in this example the merchant has set up its account to accept uncleared funds.

Computer system 30 notifies 82 the merchant computer 22 that the transaction has completed. Computer system 30 also indicates that the funds received are uncleared funds. Merchant computer 22 decrypts 84 the notification message and places the order on hold 86. Thus the merchant is protected in the event that the user fails to deposit adequate funds into her account 22 to proceed with the purchase.

At some point computer system 30 receives notification from bill payment system 35 that a remittance has been received 88 on account of the user which is sufficient to clear the funds. Reconciliation system 52 matches up that payment with the user's account 42 and clears 90 the funds (which have previously been transferred to the merchant's account 42). Merchant computer system 22 queries 92 computer system 30 regarding the status of the funds. Computer system 30 confirms 94 that the funds are cleared. Merchant computer system 22 flags the order to be fulfilled 96. All messages exchanged between computer system 30 and merchant computer 22 are preferably encrypted and signed.

In the foregoing example, if the user's account 42 had contained sufficient cleared funds in her account to cover the transaction then, after the user had authorized the transaction the merchant would be notified that the transaction was successful and cleared funds would have been deposited into the merchant's account 42. The subsequent steps of clearing the funds involved in the transaction would have been unnecessary.

EXAMPLE II

Recycling Electronic Cash

Figure 5:
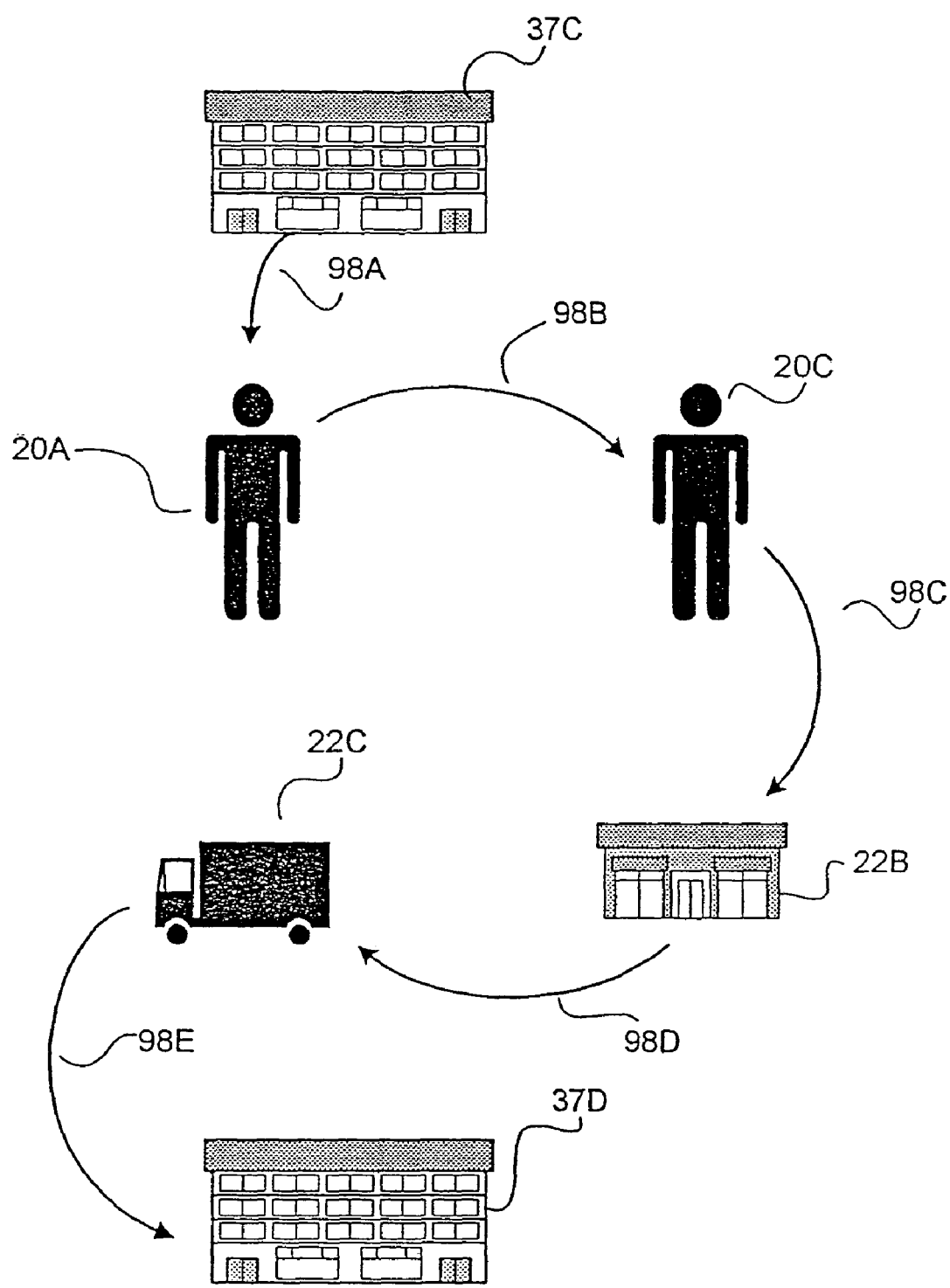

As shown in FIG. 5, electronic cash according to this invention may be reused several times without being converted back to "real" cash each time. In the Example of FIG. 5, a first user 20B who has a bank account at a bank 37C and an account 42 on computer system 30 transfers $50 from his bank account to his account on computer system 30 in a transaction 98A. The first user then decides to loan $30 to his friend, a second user 20C, by making a transfer to his friend's account 42 in a transaction 98B. In preferred embodiments of the invention each user account 42 corresponds to one specific e-mail address. When this is the case, the only information that the first user 20B requires to deposit funds into his friend's account 42 is his friends e-mail address. The first user does not need to know the ID of his friend's account 42.

The friend decides to purchase some goods from a merchant 22B using the $30 received from second user's account 42 in a transaction 98C. Merchant 22B uses these funds, in part, to pay a trucking company 22C who maintains a merchant account on computer system 30 in a transaction 98D. Trucking company 22C decides to transfer the funds to its account in a bank 37D and does so in a transaction 98E. It can be appreciated that given a large enough community of users and merchants who all have accounts 42 on computer system 30, funds could be recycled a great many times without being converted back to regular cash.

Some Advantages of Preferred Embodiments

It can be appreciated from the foregoing that the system of this invention provides some advantages over prior art on-line payment systems such as credit cards. For merchants the system can provide better cash flow because the merchant can receive cash payment for purchases more quickly with the system of this invention than with current credit card systems. Furthermore, after a payment has been made with cleared funds, the payment cannot be rescinded, as can sometimes occur with credit card transactions. From the point of view of banks, use of the system of this invention encourages on-line banking. This reduces costs for the banks. For users the system is easy-to-use, secure and convenient. No important information about the user's account 42 needs to be left at any merchant computer (unlike the case of credit cards wherein the merchant will typically retain a record of the credit card number, credit card holder and credit card expiry date). The system is secure because the cleared funds in accounts 42 are always backed by an equivalent amount of actual cash stored in bank account 44. The system is convenient because it can be accessed from any internet-connected device including internet-enabled cell phones, internet-connected personal digital assistants ("PDAs"), or internet-connected computers.

The system is flexible because it can be applied to transactions both large and small. It is useful for business to business transactions, consumer to business transactions and consumer to consumer transactions.

As will be apparent to those skilled in the art in the light of the foregoing disclosure, many alterations and modifications are possible in the practice of this invention without departing from the spirit or scope thereof. For example:

computer system 30 will not generally be a single computer but will typically comprise several computers which can communicate with one another to provide the functions described herein as well as other functions, such as providing firewalls to prevent unauthorized access to computer system 30. The architecture of computer system 30 may be varied without departing from the broad scope of the invention. A reference paper describing secured, fault tolerant scalable computer systems which use APACHE™ servers and Java Server Pages ("JSP") to provide web based interfaces to users is described at: http://java.apache.org/jserv/howto.load-balancing.html which is incorporated herein by reference. This is but one example of an architecture known to those skilled in the art which may be applied to computer system 30;

interfaces other than web-based interfaces may be used to permit the exchange of information between users, merchants and computer system 30;

instead of performing user authentication by comparing a stored password to a password supplied by a user, computer system 30 may use alternative user authentication protocols;

database 40 may be implemented as a distributed database. It is not necessary for all of the information in database 40 to be stored in the same place or even on the same computer;

While the system has been described as being used to pay for goods or services ordered on-line over the Internet, there is no reason why a merchant could not have an Internet-connected computer 20 in a physical store. Customers could use the computer to transfer funds to an account of the merchant on computer system 30 either by connecting directly to computer system 30 or by connecting to a web site of the merchant. A merchant with an in-store computer could also accept cash in exchange for depositing funds in a user's account 42. Thus, users could replenish their accounts 42 at merchant businesses in addition to transferring funds through the use of a bill payment system 35;

bank account 44 need not be a single bank account but may comprise multiple bank accounts. The bank accounts may even be at different institutions so that the system is insulated against the possibility that any single financial institution might fail.

Accordingly, the scope of the invention is to be construed in accordance with the substance defined by the following claims.

What is claimed is:

1. A method performed in a programmed computer system for administering an on-line payment system, the computer system maintaining a database containing account information for a plurality of user accounts, the method comprising a) receiving deferred remittance information indicating an amount to be deposited by deferred remittance to a bank account associated with the computer system, for application to a first one of the user accounts;

b) adding the amount to be deposited to a balance in the first one of the user accounts and marking the added amount as being uncleared in the database;

c) receiving a deposit notification indicating an amount of a remittance which has been deposited in the bank account for application to the first one of the user accounts; and, d) reconciling the deposit notification with the deferred remittance information by:
   i) if the amount of the remittance is equal to the amount to be deposited, marking the added uncleared amount as being cleared in the database;
   ii) if the amount of the remittance is less than the amount to be deposited, marking funds in the added uncleared amount totalling the amount of the remittance as being cleared in the database; and,
   iii) if the amount of the remittance is greater than the amount to be deposited, marking the added uncleared amount as being cleared in the database and adding to the balance in the one user account an amount equal to the excess of the amount of the remittance over the added uncleared amount.

2. The method of claim 1 wherein receiving the deposit notification comprises receiving an EDI notification from a bill payment system.

3. The method of claim 2 wherein the EDI notification contains notifications of remittances for application to a plurality of the user accounts and the method comprises parsing the EDI notification to associate each of the remittances with one of the user accounts.

4. The method of claim 1 wherein each of the user accounts is associated with a unique e-mail address and the database contains a record of the e-mail address associated with each of the user accounts.

5. The method of claim 1 comprising recording in the database a transaction involving a transfer of at least a portion of the added uncleared amount from the first one of the user accounts to a second one of the user accounts before receiving the deposit notification.

6. The method of claim 5 wherein marking the added uncleared amount as being cleared in the database comprises marking the at least a portion of the added uncleared amount in the second one of the user accounts as being cleared.

7. The method of claim 5 wherein reconciling the deposit notification with the deferred remittance information comprises searching the database for transactions involving uncleared funds originating from the first user account.

8. The method of claim 7 comprising periodically rolling back any transactions involving uncleared amounts which remain uncleared.

9. The method of claim 7 comprising rolling back any transactions involving uncleared amounts which remain uncleared for a time in excess of a threshold time.

10. The method of claim 1 wherein one or more of the plurality of user accounts is configurable to not accept transfers of uncleared amounts.

11. The method of claim 1 comprising multiple interfaces to an accounting system which maintains the account information in the database.

12. The method of claim 11 wherein each of the user accounts is associated with one of the user interfaces.

13. The method of claim 11 wherein one of the interfaces comprises a web-based wallet interface and the method comprises generating and displaying to a user a web page containing information about a balance in one of the user accounts.

14. The method of claim 6 comprising generating a communication informing a user associated with the second one of the user accounts when the added uncleared amount in the second one of the user accounts becomes cleared.

15. The method of claim 6 comprising providing an interface whereby a user associated with the second one of the user accounts can ascertain the status of transactions involving the second one of the user accounts, wherein the method includes querying the database to determine whether amounts transferred to the second one of the user accounts are cleared.

16. The method of claim 1 comprising transferring a cleared amount from the first one of the user accounts to a user's bank account by generating an electronic message instructing a bank holding the bank account associated with the computer system to transfer funds equalling the cleared amount to the user's bank account and reducing the balance in the first one of the user accounts by the cleared amount.

17. The method of claim 16 comprising generating a request for approval of the transfer of the cleared amount and, subsequent to receiving approval, forwarding the electronic message to the bank holding the bank account associated with the computer system.

18. The method of claim 1 wherein the bank account associated with the computer system comprises a plurality of bank accounts held by a plurality of different financial institutions.

19. A computer system for facilitating on-line payments, the computer system comprising:

a) a database containing account information for a plurality of user accounts;

b) an interface for receiving deposit information regarding amounts of deferred remittances to be made to a bank account associated with the computer system for application to the user accounts; and, c) a banking interface for receiving notifications of remittances deposited in the bank account; wherein the computer system is configured to:
   i) add the amount of a deferred remittance to a balance in a corresponding one of the user accounts upon receiving the deposit information;
   ii) mark the added amount in the database as being uncleared; and,
   iii) upon receiving a notification of one or more remittances deposited in the bank account, reconciling the remittances with uncleared amounts in the database and marking reconciled uncleared amounts as being cleared.

20. The computer system of claim 19 comprising a database management system, an accounting system and a reconciliation system wherein the accounting system maintains account balances of the user accounts in the database and generates records of transactions involving transfers of funds into or out of the user accounts and the reconciliation system tracks whether or not funds in the user accounts correspond to funds actually received in a bank account associated with the computer system.

21. The computer system of claim 1 wherein the banking interface receives notifications of remittances deposited in the bank account in an EDI format.

* * * * *